United States Patent
Sasaki et al.

(10) Patent No.: US 6,325,954 B1
(45) Date of Patent: Dec. 4, 2001

(54) METHOD OF CONTROLLING ELECTRIC INJECTION UNIT OF INJECTION MOLDING MACHINE

(75) Inventors: Kiyoshi Sasaki, Mishima; Fumiyuki Kato, Nagaizumi-cho; Tsuginobu Totani, Numazu; Fukio Iimura; Jun Koike, both of Shimizu-cho; Masahiro Tamaki, Susono; Yutaka Yamaguchi, Kannami-cho, all of (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/325,547

(22) Filed: Jun. 4, 1999

(30) Foreign Application Priority Data

Jun. 5, 1998 (JP) .................................. 10-158255

(51) Int. Cl.[7] .................................................. B29C 45/77
(52) U.S. Cl. .................... 264/40.1; 264/40.5; 264/328.1; 425/145; 425/149
(58) Field of Search ................................. 264/40.1, 40.5, 264/40.7, 328.1; 425/135, 145, 149

(56) References Cited

U.S. PATENT DOCUMENTS 3,859,400 * 1/1975 Ma .
4,146,601 * 3/1979 Bishop ............................... 264/40.1
4,753,588 * 6/1988 Kiya ................................... 264/40.7
5,371,450 * 12/1994 Hiraoka ............................. 425/145
5,595,693   1/1997 Fujita et al. ...................... 264/40.1
5,611,975 * 3/1997 Kamiguchi et al. ............... 264/40.1
5,733,486   3/1998 Hayasi et al. ..................... 264/40.1

FOREIGN PATENT DOCUMENTS

228799 *  7/1987 (EP) .
2-39973    9/1990 (JP) .
3-1139     1/1991 (JP) .
4-57490    9/1992 (JP) .
7-39123    5/1995 (JP) .
7-119033  12/1995 (JP) .
8-66944    3/1996 (JP) .
10-193424  7/1998 (JP) .

* cited by examiner

*Primary Examiner*—Jill L. Heitbrink
(74) *Attorney, Agent, or Firm*—Pillsbury Winthrop (57) ABSTRACT

An injection speed control procedure is applied to controlling an injection screw included in an electric injection molding machine and driven by an electric motor. An injection process is divided into a plurality of injection stages. Injection speed at which the injection screw is moved is changed at a time point when a value PS obtained by integrating injection pressure with respect to the position of the injection screw or a value PT obtained by integrating injection pressure with respect to injection time coincides with a predetermined reference value determined for each injection stage.

1 Claim, 6 Drawing Sheets

METHOD OF CONTROLLING ELECTRIC INJECTION UNIT OF INJECTION MOLDING MACHINE

BACKGROUND OF THE INVENTION

1. Field of the Invention

The present invention relates to a method for controlling an electric injection unit and, more particularly, to an injection speed control procedure for timing the change of the injection speed of an injection molding machine which carries out an injection process having a plurality of different injection stages to inject a molten resin into the cavity of a mold.

2. Description of the Related Art

Figure 5:
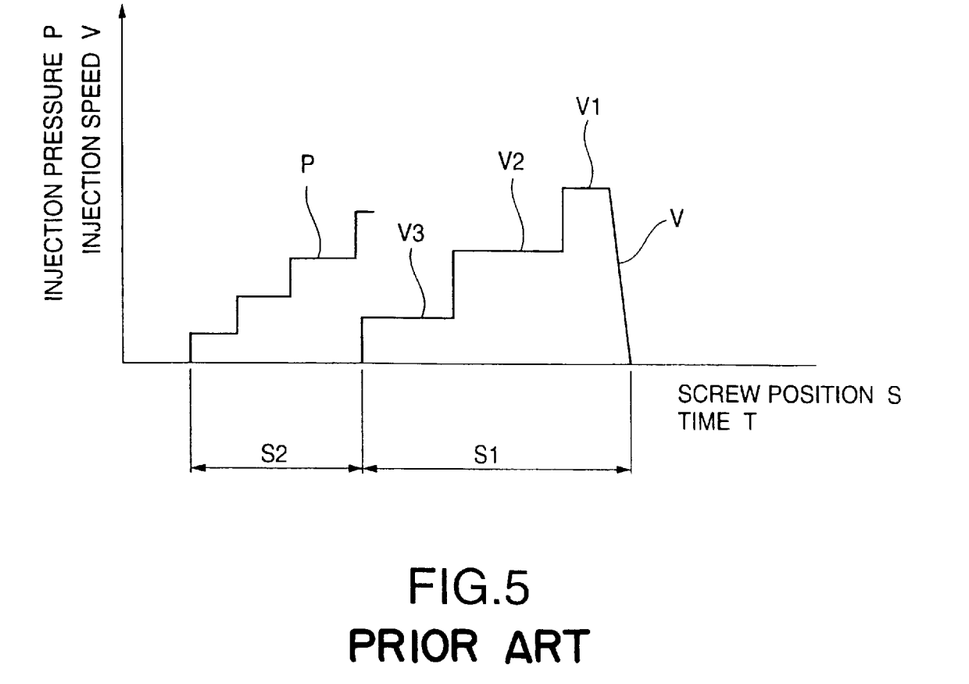
FIG. 5 is a diagram showing the speed control characteristic and the pressure control characteristic of a prior art injection control procedure in a filling phase and a dwelling phase.

FIG. 5 is a diagram of assistance in explaining a conventional injection molding method, in which the position S of an injection screw with respect to a reference position or time from a reference time point is measured on the horizontal axis, and the injection speed V of the injection screw or injection pressure P is measured on the vertical axis. The injection process represented by FIG. 5 comprises an injection phase S1 for injecting a molten resin into a cavity formed in a mold by advancing the injection screw and changing the injection speed V of the injection screw stepwise at a plurality of stages, and a dwelling phase S2 for holding the injection pressure for molding after the completion of the injection phase by changing the injection pressure P stepwise at a plurality of stages.

Generally, in the injection phase S1, a pressure control valve included in a hydraulic circuit is set for a high pressure, and the opening of a flow control valve is varied according to the position of the injection screw with respect to a reference position or time elapsed from the start of an injection molding process so that the speed of the injection screw changes stepwise at a plurality of stages with the distance of movement of the injection screw or time elapsed from the start of the injection molding process. When filling up the cavity with a molten resin, the flow control valve is regulated to control the speed of a piston fitted in an injection cylinder, i.e., the injection speed of the injection screw.

After the cavity has been filled up with the molten resin, the opening of the flow control valve is adjusted to a relatively small opening for the dwelling phase S2. In the dwelling phase S2, the opening of the pressure control valve is regulated to apply a predetermined pressure constantly to the molten resin filling up the cavity.

Figure 6:
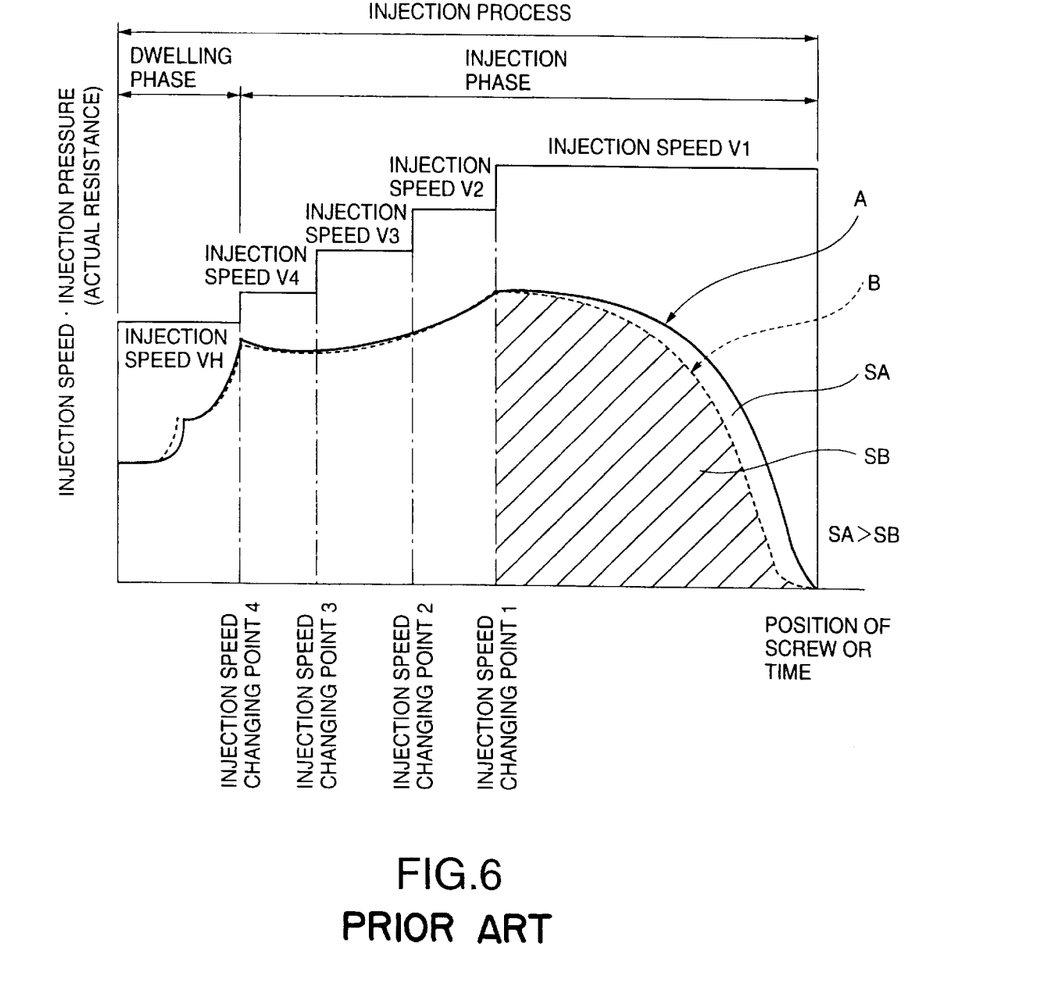
FIG. 6 is a diagram showing the relation between a speed control characteristic and a pressure control characteristic in the prior art injection control procedure.

Generally, desired injection speed is changed stepwise at time points where the measured position of the injection screw coincides with predetermined injection speed changing points to control the injection speed in the injection phase S1. FIG. 6 is a diagram representing such an injection speed control procedure, in which desired injection speeds V1, V2, V3 and V4 are given at the start of the injection process and at speed changing points 1, 2 and 3, respectively.

When injecting the molten resin into the cavity, a screw tip, i.e., a check ring, for preventing the back-flow of the molten resin on the front side of the injection screw closes at different time points in different shot cycles.

The conventional injection control method sets beforehand changing points where injection speed and injection pressure are changed. Therefore, the actual strokes of the injection screw in each of the stages for the set injection speeds and the set injection pressures are reduced if the closing operation of the check ring is delayed.

An injection region SA representing an amount of work done in a shot cycle A in which the check ring closes at an early time point, which is indicated by a continuous line A in FIG. 6, in the injection process is greater than an injection region SB representing an amount of work done in a shot cycle B in which the check ring closes at a late time point, which is indicated by a broken line B in FIG. 6, in the injection process.

Thus, in a shot cycle in which the check ring closes at a late time point, the actual amount of work for injection is reduced even if the set injection time and set injection speed are not changed. Such an injection process affects the weight and the quality of the products; that is the variation of the time point when the check ring closes causes the variation of the weight and quality of the products.

A prior art control method previously proposed in JP-A No. 8-66944 determines a change time point when an injection phase is to be changed for a dwelling phase on the basis of a measured pressure of the hydraulic fluid or the molten resin. This prior art control method determines the change time point on the basis of only the pressure measured at one time point and does not take into consideration the amount of work done in the injection process. Accordingly, this prior art control method is unable to solve satisfactorily problems causing the variation of the weight and the quality of products.

Possible causes residing in an injection molding machine and causing molding faults due to such an unstable injection process include, in addition to the variation of the time point when the check ring closes, the change of the density of the metered resin, the variation of the metered volume and the variation of the injection speed.

Various control methods giving considerations to such problems have been proposed. An injection molding machine disclosed in JP-A No. 8-66944 carries out one of those prior art control methods. This injection molding machine is provided with a position sensor for measuring the position of an injection screw, a pressure sensor, and a speed calculating device for calculating the derivative of an injection stroke measured by the position sensor with respect to time or an injection screw speed measuring device. In this injection molding machine, the injection phase is divided into a plurality of stages and the injection screw is advanced at different injection speeds at different stages, respectively. In this injection molding machine, a reference pressure for deciding the closing operation of a check ring is set at an optional point in an injection phase. The difference between a position of the injection screw at a moment when the injection pressure reaches the reference pressure and a position of the same at a moment when the injection pressure reaches the reference pressure in a predetermined reference shot cycle is calculated and stored. The injection speed is changed when the injection screw reaches the reference injection speed changing points before the injection pressure reaches the reference pressure, and the injection speed is changed when the injection screw reaches injection speed changing points determined by correcting the initial injection speed changing points by using the difference after the injection pressure has reached the reference pressure.

This control method is able to suppress the adverse effect of the irregular closing characteristic of the check ring to the least extent. However, since the effects of the change of the density of the metered resin, the variation of the metered volume and the variation of the injection speed on the condition of the molten resin are not taken into consideration in devising this control method, this control method is not necessarily satisfactory in the effect of perfectly solving the problems attributable to the unstable injection process due to the different conditions of the molten resin in different shot cycles.

Another injection molding machine proposed for the same purpose in JP-B No. 2-39973 measures the hydraulic pressure applied to an injection ram and the injection speed of an injection screw, the product of hydraulic pressure and injection speed measured from the start of the injection process to the termination of the dwelling phase is integrated with respect to time, the integral thus obtained is compared by a comparator with values in a predetermined reference range set by a reference range setting device and, if the integral is outside the reference range, a signal is generated.

An injection pressure monitoring system proposed in JP-B No. 4-57490 to monitor a condition of an injection process on the basis of time taken by an injection molding machine to raise injection pressure comprises: a pressure sensor disposed in a part of the injection molding machine in which pressure is produced; a pressure comparing means which compares a pressure measured by the pressure sensor with a predetermined pressure and provides a pressure coincidence signal when the pressure measured by the pressure sensor coincides with the predetermined pressure, an integrator which starts an integrating operation to integrate a fixed reference voltage at a moment when a start signal is given thereto, provides an integral voltage corresponding to an integral obtained by the integrating operation, and stops the integrating operation upon the reception of the pressure coincidence signal from the pressure comparing means; a first comparing unit which compares the integral voltage with a predetermined upper limit voltage and provides an upper limit signal when the integral voltage coincides with the upper limit voltage; an upper limit alarm generating device which generates an upper limit alarm when the pressure coincidence signal is generated after the upper limit signal; a second comparing unit which compares the integral of voltage with a predetermined lower limit voltage and provides a lower limit signal when the integral voltage coincides with the lower limit voltage; and a lower limit alarm generating device which generates a lower limit alarm when the pressure coincidence signal is generated before the lower limit signal. This injection pressure monitoring system monitors the injection pressure of the injection molding machine, and generates an alarm when time taken by the injection molding machine to raise the injection pressure to the predetermined pressure is outside the predetermined reference range.

The foregoing two prior art techniques are designed to examine conditions and generate an alarm when the condition meets a specific condition and takes nothing into consideration about a method and an apparatus for the feedback control of an injection molding machine.

A prior art control method proposed in JP-B No. 3-1139 to stabilize the quality of moldings by always supplying a fixed quantity of energy into the cavity of a mold during an injection phase comprises the steps of measuring injection pressure and injection speed, integrating the product of injection pressure and injection speed with respect to time during an injection phase, comparing the integral with a predetermined reference value, and starting a dwelling phase upon the coincidence of the integral with the predetermined reference value.

However, this prior art control method is able to correct only a speed region immediately before the dwelling phase, and the amount of work done by the injection process is unable to follow properly the variation of the condition of the molten resin with time, the control method is unsatisfactory in achieving stable molding to produce good moldings.

Problems exactly the same as those unsolved problems in those prior art methods of controlling the speed of an injection molding machine are found in an electric injection machine in which an injection screw is driven for forward and backward movement by a servomotor to meter and inject a molten resin, and a mold is closed and opened by a servomotor.

To solve those problems, various methods of controlling the injection operations of electric injection molding machines have been proposed. A method of controlling an injection molding machine proposed in JP-B No. 7-119033 employs a servo driving unit provided with a servo amplifier for the feedback control of injection speed, and an arithmetic and control unit for controlling the general operations of the injection molding machine according to predetermined molding conditions. When an actual injection pressure pattern showing the variation of injection pressure in a primary injection process deviates from a predetermined average injection pressure pattern, the arithmetic and control unit corrects a predetermined injection speed pattern representing desired values for servo control so that actual injection pressure patterns in the next and the following injection processes may be within an allowable range.

This control method achieves a molding operation capable of producing good moldings by suppressing the variation of injection pressure in the primary injection process to the least possible extent and takes nothing about the amount of work into consideration. Consequently, the variation of the weight and the quality of produces cannot satisfactorily be reduced.

A method of controlling the injection operation of an electric injection molding machine is disclosed in JP-B No. 7-39123. An electric injection molding machine disclosed in JP-B No. 7-39123 is provided with a constant setting means for setting an optional constant included in an relational expression: (Actual filling pressure)×(Actual injection speed)=Constant necessary for calculating a limit filling pressure and an actual injection speed to be used as thresholds for deciding whether or not injection speed control is to be removed, a speed control means for controlling injection speed so that the product of actual filling pressure measured by a pressure sensor and actual injection speed is equal to the constant set by the constant setting means, and a pressure control means for comparing an actual filling pressure measured by the pressure sensor in an injection phase and a limit injection pressure set by the constant setting means, and removing injection speed control when the actual filling pressure reaches the limit filling pressure to maintain pressure constant for filling control.

This control method reduces injection speed as actual filling pressure approaches the limit filling pressure to improve the dimensional accuracy of moldings and takes nothing about the amount of work into consideration. Consequently, the variation of the weight and the quality of produces cannot satisfactorily be reduced.

SUMMARY OF THE INVENTION

Accordingly, it is an object of the present invention to solve problems in the foregoing prior art techniques and to achieve molding capable of stably producing good products.

Another object of the present invention is to provide an injection speed control procedure for controlling the injection speed of an electric injection molding machine, capable of maintaining the amount of work done in an injection process constant regardless of the irregular closing operation of a check ring included in a screw tip for preventing the back-flow of a molten resin at different time points in different shot cycles, causing unstable molding.

With the foregoing object in view, the present invention provides a method of controlling an electric injection unit of an injection molding machine during an injection process having an injection phase for filling up a cavity formed in a mold with a molten resin and a dwelling phase for maintaining the pressure in the cavity, the unit having an injection screw driven by electric motor, the method including the steps of: dividing the injection process into a plurality of injection stages to be executed sequentially, wherein the injection speed in the adjacent injection stages are different each other; executing each of the injection stages while controlling the operation of the injection screw so that a value PS obtained by integrating injection pressure with respect to the position of the injection screw or a value PT obtained by integrating injection pressure with respect to injection time may coincide with or may substantially coincide with reference values assigned respectively to the injection stages.

Preferably, the step of executing each of the injection stages including the steps of: moving the injection screw at a predetermined injection speed for the injection stage; monitoring the value PS or the value PT throughout the injection stage in a real-time mode; comparing the value PS or value PT with a predetermined reference value assigned to the injection stage in a real-time mode; and entering into the next injection stage, when the value PS or the value PT reaches or approaches close to the reference value.

The method may further including the step of previously determining the reference value corresponding to the value PS or the value PT for each of the injection stages. Preferably, the reference value is determined through test injection molding operations, and the reference value is equal to a value PS or a value PT calculated in each injection stage in an optimum test injection molding operation which produced moldings of satisfactory quality.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
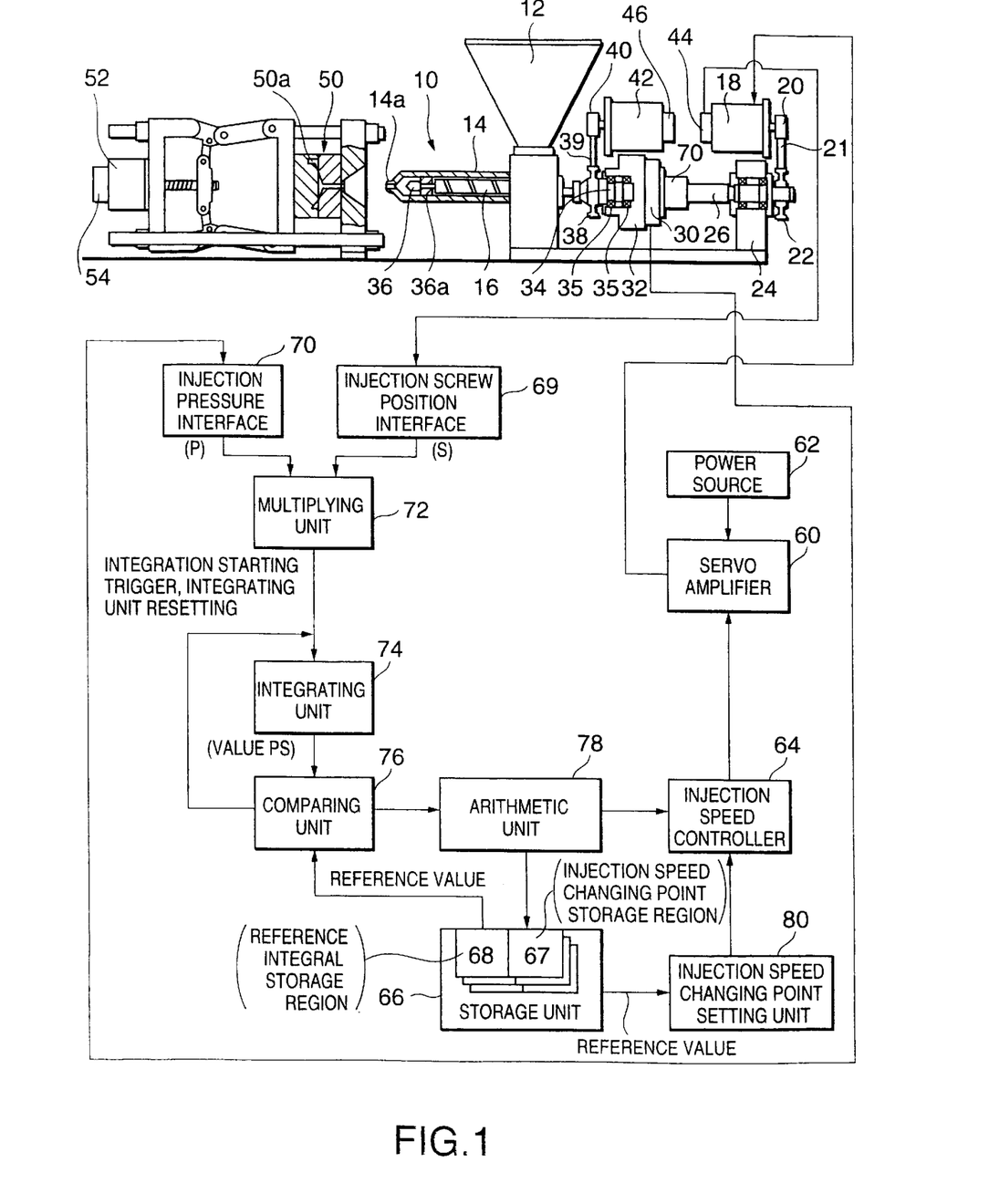
FIG. 1 is a schematic elevation of an electric injection molding machine and a block diagram of an injection controller for executing an injection speed control procedure in a preferred embodiment according to the present invention for controlling the injection speed of an injection screw included in the electric injection molding machine.

FIG. 1 shows an electric injection molding machine 10 and an injection controller for executing an injection speed control procedure in a preferred embodiment according to the present invention for controlling the injection speed of the electric injection molding machine 10. The injection molding machine 10 has a barrel 14 provided with a hopper 12, and an injection screw 16 inserted in the barrel 14 for rotation and axial movement therein.

An injection servomotor 18 is disposed behind the rear end of the injection screw 16 to drive the injection screw 16 for axial movement. The rotative driving power of the injection servomotor 18 is transmitted through a transmission mechanism comprising a drive pulley 20, a synchronous belt 21 and a driven pulley 22 to a threaded rod 26 included in a ball screw and supported for rotation on a support bracket 24. A threaded nut 28 engaged with the threaded shaft 26 is fastened through a load cell 30 to a thrust box 32 with bolts. An S shaft 34 is supported for rotation in a bearing 35 on the thrust box 32. The injection screw 16 is coupled with and keyed to the S shaft 34.

The screw 16 is provided in its front end part with a screw tip 36 provided with a check ring 36A to prevent the reverse flow of a molten resin. A nozzle 14 a is formed in a front end part of the barrel 14. When injecting the molten resin prepared in the barrel 14 into a cavity 50 A formed in a mold 50, the nozzle 14 A is pressed against a sprue bushing attached to the mold 50. A mold clamping mechanism for closing, opening and clamping the mold 50 is driven by a clamping servomotor 52.

The threaded rod 26 is rotated by the output torque of the injection servomotor 18 to move the threaded nut 28 axially. Consequently, the injection screw 16 is moved axially. Thus, the ball screw coverts a rotating motion of the output shaft of the injection servomotor 18 into a longitudinal motion of the injection screw 16. The injection screw 16 is thus advanced for an injection operation.

The S shaft 34 is driven for rotation through a transmission mechanism comprising a driven pulley 38, a synchronous belt 39 and a drive pulley 40 by a charging servomotor 42. The S shaft 34 is driven for rotation by the charging servomotor 42 to carry out a charging operation when the injection screw 16 is moved backward.

A thrust exerted on the injection screw 16 is transmitted through the S shaft 34, the bearing 35 and the thrust box 32 to the load cell 30, and the load cell 30 measures the thrust. Thus, the load cell 30 is able to measured a filling pressure, i.e., the pressure of the molten resin in the cavity 50A.

A first rotary encoder 44 is combined with the charging servomotor 18. The first rotary encoder 44 serves as a screw movement measuring device for measuring the distance of advancement of the injection screw 16 gradually advancing during an injection process to determine the position of the injection screw 16. The first rotary encoder 44 may be substituted by a linear scale for measuring distance of movement of the thrust box 32 connected to the injection screw 16.

A second rotary encoder 46 is combined with the charging servomotor 42. The second rotary encoder 46 serves as a charging rotation measuring device for measuring the rotation of the injection screw 16.

A third rotary encoder 54 is combined with the clamping servomotor 52. The third rotary encoder 54 serves as a mold position measuring device for measuring the position of the movable half mold of the mold 50.

A power source 62 is connected through a servo amplifier 60 to the injection servomotor 18 for driving the injection screw 16 for axial movement, and an injection speed controller 64 is connected to the servo amplifier 60. The injection speed controller 64 calculates an injection speed changing point on the basis of the respective output signals of the first rotary encoder 44 and the load cell 30, and generates an injection speed control signal.

The injection speed controller 64 calculates an integral, i.e., value PS, for each of a plurality of predetermined injection stages on the basis of measured injection pressure P measured by the load cell 30 and measured distance S of movement of the injection screw 16 measured by the first rotary encoder 44, determines an injection speed changing point and provides a control signal representing the injection speed changing point.

Figure 2:
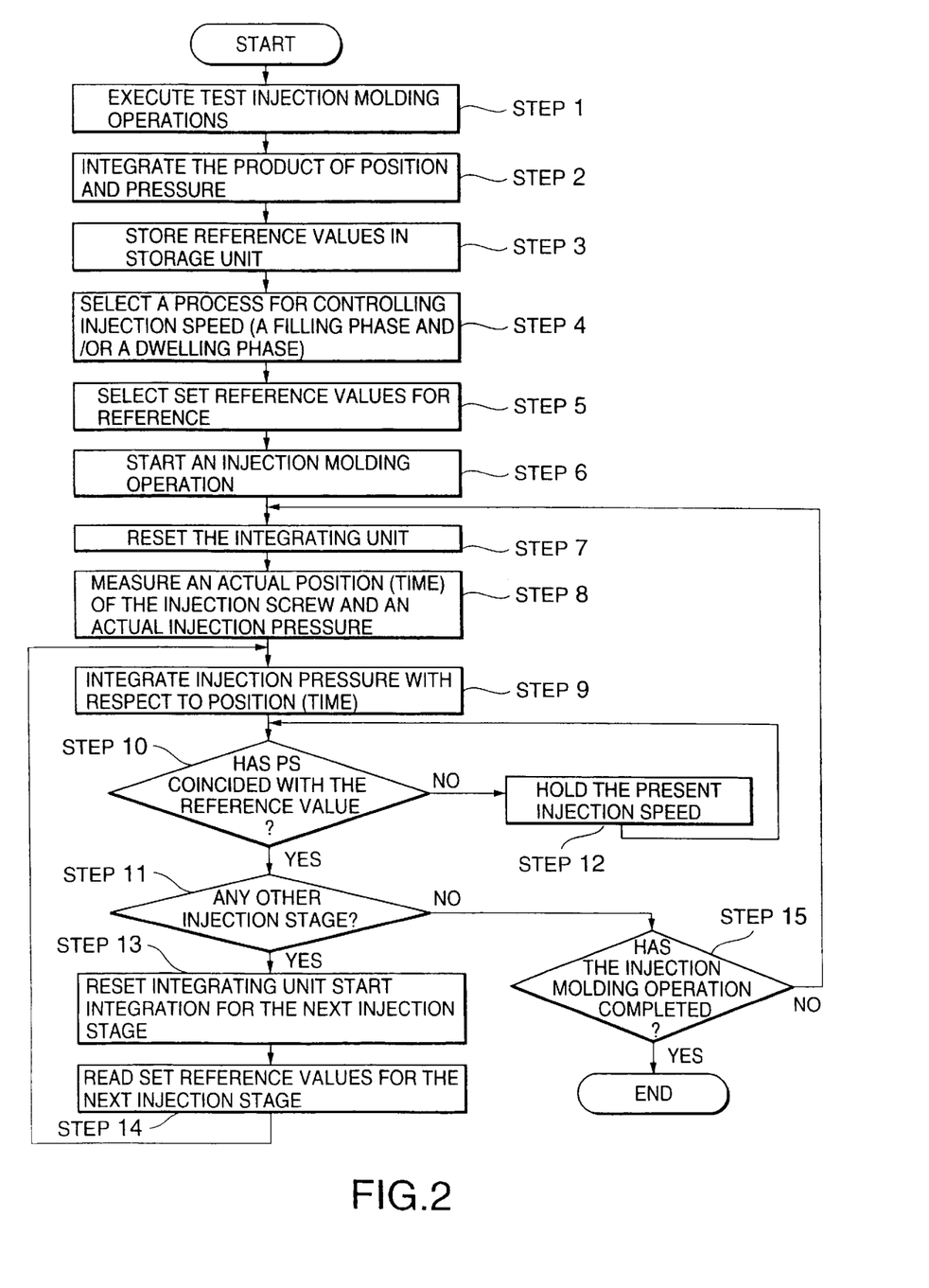
FIG. 2 is a flow chart of an injection speed control procedure to be carried out by the injection controller shown in FIG. 1.

The control operation of the injection controller for controlling the electric injection molding machine 10 will be described with reference to FIGS. 2 and 3. In a diagram shown in FIG. 3, distance traveled by the injection screw 16 is measured to the left on the horizontal axis, and injection pressure and injection speed are measured upward on the vertical axis. The electric injection molding machine 10 carries out an injection process consisting of a plurality of injection stages to inject the molten resin into the cavity 50A of the mold 50.

A test injection molding operation is carried out in STEP 1 to determine reference values for optimum injection molding conditions suitable for producing moldings of good quality. An integral of the product of distance traveled by the injection screw 16 and the injection pressure in each of the injection stages is calculated in STEP 2 to determine a reference value. Reference values thus calculated are stored in a reference integral storage region 68 and an injection speed changing point storage region 67 of a storage unit 66 in STEP 3 Data on molding conditions suitable for producing moldings of good quality and selected processes to be controlled are stored in the storage unit 66 to give control signals and controlled variables to necessary control means.

A process for controlling injection speed (a filling phase and/or a dwelling phase) is selected in STEP 4, and set reference values for injection speed control are selected in STEP 5.

Subsequently, an injection molding operation using data on the injection speed changing point and integrals is started in STEP 6.

The injection molding machine 10 is provided with an injection screw position interface 69 provided with a signal converter for converting a screw position (distance traveled) signal measured by the first rotary encoder 44 into a corresponding voltage, an injection pressure interface 70 provided with a signal converter for converting an injection pressure signal provided by the load cell 30 into a corresponding voltage, a multiplying unit 72 for calculating the product of signals provided by the interfaces 69 and 70, an integrating unit 74 for integrating the output of the multiplying unit 72, a comparing unit 76 for comparing a calculated value provided by the integrating unit 74 with a set reference value, and an arithmetic unit 78 for calculating an injection speed changing point where injection speed is held or changed for proper molding for the control of the next injection stage.

A control signal representing an injection speed changing point calculated by the arithmetic unit 78 is given to the injection speed controller 64, and is given through the storage unit, 66 to an injection speed changing point setting unit 80. The injection speed changing point setting unit 80 gives an injection speed changing point setting signal to the injection speed controller 64.

When starting the injection molding operation of the electric injection molding machine 10 and injection speed control in STEP 6, the integrating unit 74 is reset in STEP 7, an actual position of the injection screw 16 (distance traveled by the injection screw 16) is measured by the first rotary encoder 44, and an actual injection pressure is measured by the load cell 30. The actual position of the injection screw 16 and the actual injection pressure are given respectively through the injection screw position interface 69 and the injection pressure interface 70 to the multiplying unit 72. The multiplying unit 72 calculates the product of the injection screw position (distance traveled by the injection screw 16) and the injection pressure in STEP 8.

The integrating unit 74 integrates the output of the multiplying unit 72 in STEP 9. The comparing unit 76 compares the integral calculated by the integrating unit 74 with a set reference value determined through the test injection molding operation in STEP 10. If the integral calculated by the integrating unit 74 coincides with the reference value, a query is made in STEP 11 to see if there is any subsequent injection stage. If the integral calculated by the integrating unit 74 does not coincide with the reference value, the injection speed in the present injection stage is held (STEP 12), and STEP 10 is repeated until the integral calculated by the integrating unit 74 coincides with the reference value.

If the response in STEP 11 is affirmative, the integrating unit 74 is reset and is instructed to start integration in STEP 13, and set reference values for the next injection stage are read in STEP 14. Then, STEP 9 and the following steps are repeated.

If the response in STEP 11 is negative, a query is made in STEP 15 to see if the molding operation has been completed. If the response in STEP 15 is affirmative, the shot cycle is terminated. If the response in STEP 15 is negative, STEP 7 and the following steps are repeated.

Figure 3:
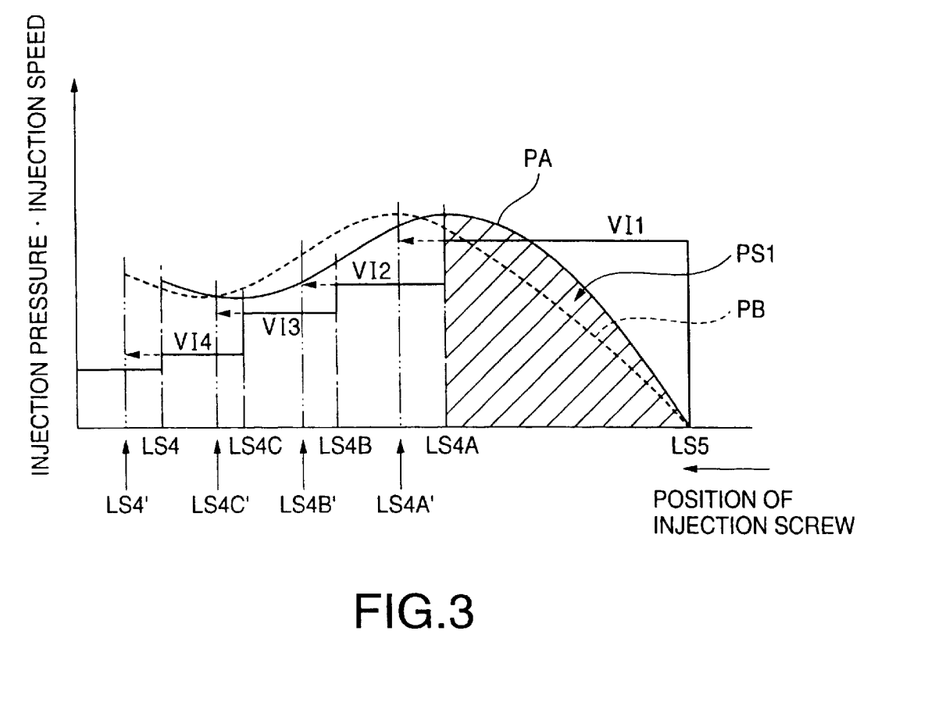
FIG. 3 is a diagram showing the relation between a speed control characteristic and a pressure control characteristic of an injection process of assistance in explaining the principle of the injection speed control procedure in accordance with the present invention.

In FIG. 3, a characteristic curve PA indicates an optimum injection pressure characteristic recorded and held when producing good moldings by the test injection molding operation. An optimum injection speed characteristic is represented by injection speed V11, V12, V13 and V14. Integral (value PS) of the product of measured injection pressure (P) and measured distance traveled by the injection screw 16 is calculated by the multiplying unit 72 and the integrating unit 74 by using Expressions (1) to (4), and the calculated integrals are stored in the reference integral storage region 68 of the storage unit 66.

$$\text{Stage 1 } (LS5-LS4A): PS1 = \int_{LS5}^{LS4A} P(x)dx \quad (1)$$

$$\text{Stage 2 } (LS4A-LS4B): PS2 = \int_{LS4A}^{LS4B} P(x)dx \quad (2)$$

-continued $$\text{Stage 3 } (LS4B - LS4C): PS3 = \int_{LS4B}^{LS4C} P(x)\,dx \quad (3)$$

$$\text{Stage 4 } (LS4C - LS4): PS4 = \int_{LS4C}^{LS4} P(x)\,dx \quad (4)$$

The value of PS1 in the stage 1 for optimum injection molding conditions is equal to a shaded area in FIG. 3. Similarly, the values of PS2 to PS4 in stages 2 to 4 for optimum injection molding conditions are expressed by Expressions (2) to (4).

Sometimes, the closing operation of the check ring 36A (FIG. 1) is delayed behind an optimum position of the injection screw 16 for optimum injection molding conditions in the injection process. In such a case, the injection pressure characteristic assumes a characteristic curve PB (broken line). Therefore, if the injection speed changing points for optimum injection molding conditions (i.e., the screw positions LS4A, LS4B, LS4C and LS4) are kept unchanged, molding faults will occur.

To produce good moldings when the injection pressure varies as indicated by the injection pressure characteristic curve PB (broken line) for bad conditions, the value of PS in the stage 1 defined by the injection pressure curve PB must be equal to PS1 in the stage 1 defined by the injection pressure curve PA for optimum injection molding conditions. Therefore, the injection speed for the stage 1 is changed for the injection speed for the stage 2 when the injection screw 16 reaches a position LS4A' where the value of PS defined by the injection pressure curve PB coincides with the PS1 in the stage 1. The calculation of PS1 using Expression (1) to determine the position LS4A' is started upon the start of the injection molding operation and is carried out in a real-time mode, and the injection speed controller 64 changes the injection speed upon the coincidence of PS with the PS1, i.e., upon the coincidence of the amount of work done by the injection molding operation with a reference amount of work.

Similarly, calculation using Expressions (2) to is performed for the stages 2 to 4, and the injection speed is changed when the injection screw 16 reaches positions LS4B', LS4C' and LS4' where the calculated values of PS defined by the injection pressure curve PB coincide with the PS2. PS3 and PS4 in the stages 2, 3 and 4.

The foregoing embodiment changes the injection speed when the injection screw 16 reaches an appropriate position (S) to control the injection pressure according to the injection pressure characteristic for optimum injection molding conditions determined through test injection molding operation and stored in the storage unit 66. Time points where the injection speed is to be changed may be determined on the basis of time (T) elapsed from the start of the injection molding operation. When time points is determined on the basis of time, a timer is used instead of the injection screw position interface 69, an PT1 to PT4 are calculated by using expressions similar to Expressions (1) to (4).

Figure 4:
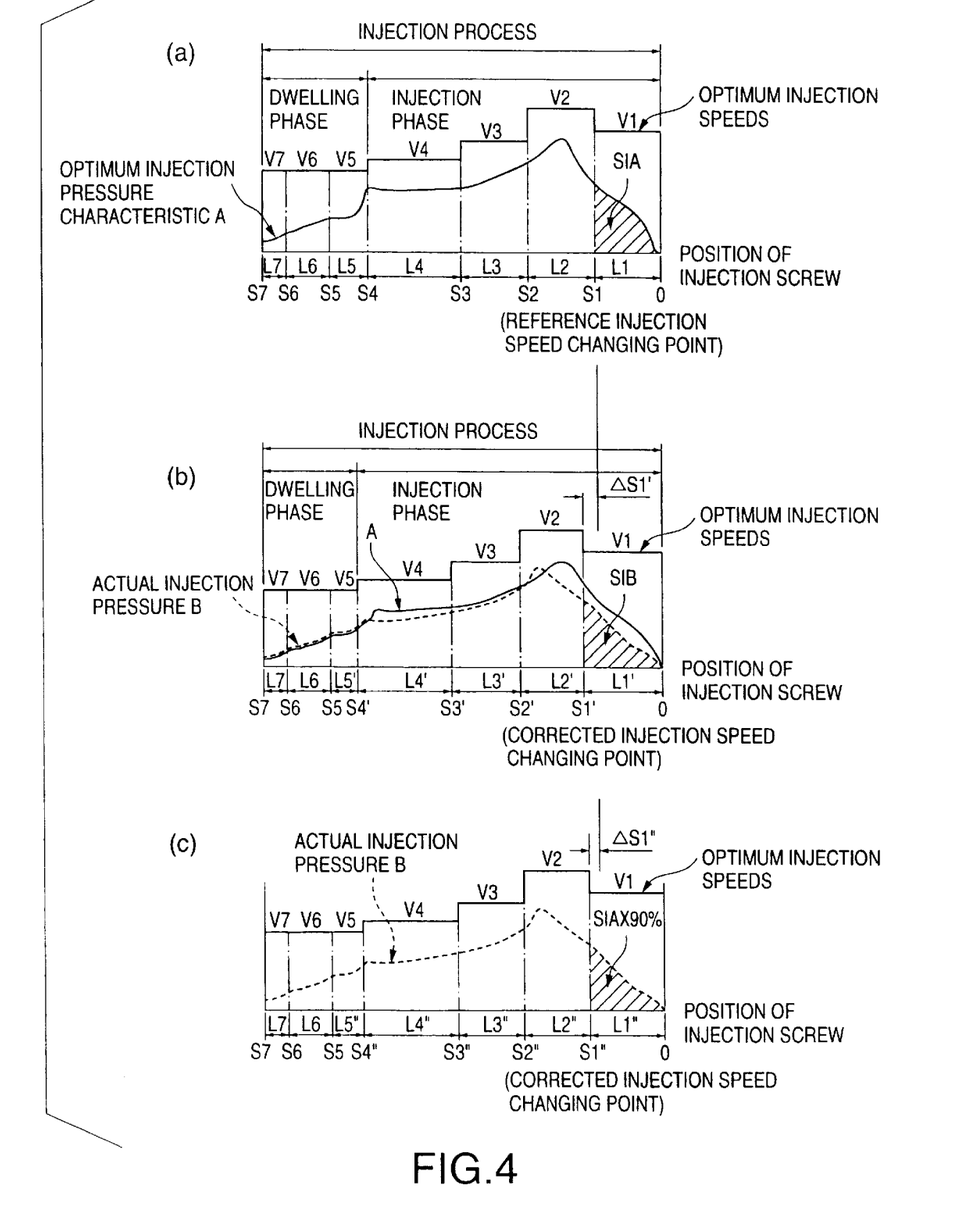
FIGS. 4(a), 4(b) and 4(c) are diagrams showing the relation between the speed control characteristic and the pressure control characteristic of the injection speed control procedure in accordance with the present invention in an injection process.

FIGS. 4(a), 4(b) and 4(c) are diagrams showing the relation between the speed control characteristic and the pressure control characteristic of the injection speed control procedure in accordance with the present invention in an injection process.

FIG. 4(a) shows the distance traveled by the injection screw 16, and injection speeds for injection stages and an injection pressure characteristic for an optimum injection molding operation.

FIG. 4(b) shows the injection pressure characteristic (broken line) and corrected speed changing points in the injection process in an actual injection molding operation. The injection speed is changed at each of corrected injection speed changing points corresponding to a point where an integral PS calculated on the basis of measured injection pressure and measured distance traveled by the injection screw 16 coincides with a predetermined reference value. The injection speed is corrected only in an injection phase.

FIG. 4(c) shows injection pressure characteristic (broken line) and corrected speed changing points in the injection process in another actual injection molding operation. The injection speed is changed at each of corrected injection speed changing points estimated when an integral PS calculated on the basis of measured injection pressure and measured distance traveled by the injection screw 16 reaches a value equal to 90% of a predetermined reference value. The injection speed is corrected only in an injection phase.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of controlling an electric injection unit of an injection molding machine during an injection process having an injection phase for filling a cavity, formed in a mold, with a molten resin and a dwelling phase for maintaining pressure in the cavity, said injection unit having an injection screw driven by an electric motor, said injection molding machine being provided with an injection pressure detector and at least one of a screw position detector capable of detecting a position of the screw and a timer capable of measuring a time elapsed from a start of the injection process, said method comprising the steps of:

dividing the injection molding process into a plurality of injection stages to be executed sequentially, wherein injection speeds in the adjacent injection stages are different from each other;

executing test injection molding operations;

determining an optimum processing condition for the injection process, under which a molding product of satisfactory quality can be obtained, based on a result of the test injection molding operations, the optimum processing condition being specified by optimum injection pressure characteristics that represent an injection pressure in each of the injection stages and optimum injection speed characteristics that represent an injection speed in each of the injection stages;

calculating a reference value of a parameter PS or a parameter PT for each of the injection stages based on the optimum processing condition, the parameter PS being an integral of the injection pressure with respect to the screw position, the parameter PT being an integral of the injection pressure with respect to the time elapsed from the start of the injection process;

storing, in a storage unit of the injection molding machine, the optimum injection pressure characteristics, the optimum injection speed characteristics, and the reference value of the parameter PS or the parameter PT for each of the injection stages; and executing a productive injection molding operation by carrying out the injection stages based on the optimum injection pressure characteristics and the optimum injection speed characteristics stored in the storage unit, each of the injection stages including the steps of:

moving the screw at a speed specified by the optimum injection speed characteristics;

monitoring the injection pressure and the screw position or the time elapsed from the start of the injection process throughout the injection stage in a real-time mode, and calculating an actual value of the parameter PS or the parameter PT in a real-time mode;

comparing, in a real-time mode, the actual value of the parameter PS or the parameter PT with the reference value of the parameter PS or the parameter PT assigned to the injection stage; and entering into a next injection stage, when the actual value of the parameter PS or the parameter PT reaches or approaches close to the reference value of the parameter PS or the parameter PT.

* * * * *